(12) United States Patent
Chamberlain (10) Patent No.: US 8,714,052 B2
(45) Date of Patent: May 6, 2014

(54) BICYCLE PEDAL

(75) Inventor: Jason L. Chamberlain, Morgan Hill, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 419 days.

(21) Appl. No.: 13/111,914

(22) Filed: May 19, 2011

(65) Prior Publication Data

US 2012/0291590 A1 Nov. 22, 2012

(51) Int. Cl.
*B62M 3/08* (2006.01)

(52) U.S. Cl.
CPC ....................................... *B62M 3/08* (2013.01)
USPC .......... 74/594.4; 74/594.6; D12/125; 384/276

(58) Field of Classification Search
CPC ....................................................... B62M 3/08
USPC ............... 74/594.4, 594.6; D12/125; 384/276
IPC .................................... B62J 25/00; B62M 3/08
See application file for complete search history.

(56) References Cited

U.S. PATENT DOCUMENTS

| 3,760,653 | A | * | 9/1973 | Hagenah | 74/594.4 |
| 4,335,628 | A | | 6/1982 | Shimano | |
| 4,373,760 | A | * | 2/1983 | Durham | 384/458 |
| 4,445,397 | A | * | 5/1984 | Shimano | 74/560 |
| 4,622,863 | A | * | 11/1986 | Denker | 74/594.6 |
| 4,716,784 | A | * | 1/1988 | Schlotterer | 74/594.6 |
| 4,882,946 | A | * | 11/1989 | Beyl | 74/594.6 |
| 5,379,665 | A | | 1/1995 | Nagano | |
| 6,227,071 | B1 | * | 5/2001 | Coombe | 74/594.4 |
| 6,244,136 | B1 | * | 6/2001 | Chen | 74/594.6 |
| 7,827,881 | B2 | | 11/2010 | Hermansen et al. | |
| 8,061,236 | B2 | * | 11/2011 | French | 74/594.4 |
| 2006/0266154 | A1 | * | 11/2006 | Hermansen et al. | 74/594.4 |
| 2008/0156142 | A1 | | 7/2008 | Deng | |
| 2009/0095122 | A1 | | 4/2009 | Weagle | |
| 2009/0241725 | A1 | | 10/2009 | Chen | |
| 2010/0064846 | A1 | | 3/2010 | Tsai | |
| 2010/0186547 | A1 | | 7/2010 | Linden | |
| 2012/0266718 | A1 | * | 10/2012 | Yang | 74/594.6 |

FOREIGN PATENT DOCUMENTS

| CN | 2267200 Y | 11/1997 | |
| DE | 102005027516 A1 | * 12/2006 | ............... B62M 3/08 |

OTHER PUBLICATIONS

English Abstract of DE 102005027516 A1, Matthias, Dec. 2006.*
EPO Machine Translation of Specification and Claims of DE 102005027516 A1, Matthias, Dec. 2006.*
Sicklines, Specialized Lo Pro Mag II Platform Pedals Preview, http://www.sicklines.com/2007/02/27/specialized-lo-pro-mag-ii-platform-pedals/, dated Feb. 27, 2007.

* cited by examiner

*Primary Examiner* — Vinh Luong (74) *Attorney, Agent, or Firm* — Knobbe Martens Olson & Bear LLP (57) ABSTRACT

A bicycle pedal can include a pedal body configured to rotate about a spindle. The pedal can also include one or more bearing systems to reduce friction between the pedal body and the spindle. The spindle can act as the inner bearing race for one or more of the bearing systems. A bearing body can act as the outer bearing race for one or more of the bearing systems.

10 Claims, 9 Drawing Sheets

BICYCLE PEDAL

BACKGROUND OF THE INVENTION

1. Field of the Invention

The present invention generally relates to bicycles. More particularly, the present invention relates to pedals and platform pedals for use with bicycles.

2. Description of the Related Art

Many types of vehicles use pedals to drive a wheel and provide power to the vehicle. Road bikes, mountain bikes, and unicycles are all examples of such vehicles as all generally use bicycle pedals to power a wheel. Generally, a rear wheel of a bicycle is supported near a rearward end of a frame, a crank assembly is rotatably supported by a lower portion of the frame and a drive chain extends between the crank assembly and the rear wheel to transfer power. The pedals are connected to the crank assembly and the rider transfers power to the bicycle through the pedals.

Pedal designs include basic pedals and a variety of clipless versions for clamping shoes to pedals. Basic pedal designs range from pedals designed to be used for casual riding, to larger pedals with aggressive traction pins to be used for downhill riding and racing. These larger pedals that may include traction pins are generally called "platform" pedals.

SUMMARY OF THE INVENTION

There exists a need for improvement in the design of pedals for bicycles, in particular, with respect to platform pedals.

In some embodiments, a bicycle assembly can comprise a pedal. The pedal can be at least one of a clipless and a platform pedal.

According to some embodiments a pedal can comprise a pedal body, a spindle, and a needle bearing. The pedal body can have a surface configured to receive a foot. The spindle can have a first end and a second end, the first end configured to be received by a crank arm attached to a bicycle frame, the second end received into the pedal body. The needle bearing can be received on or near the second end of the spindle and the spindle can be configured to act as an inner bearing race of the needle bearing.

The pedal may further include an insert configured to be received on the needle bearing and configured to attach to the pedal body. The insert can be configured to serve as an outer bearing race for the needle bearing, the insert having a top, and a bottom. The pedal body can surround at least a part of the insert. In some embodiments, he pedal body does not surround a portion of the insert top directly above the spindle or a portion of the bottom directly below the spindle.

The insert can further comprise first and second attachment portions on opposite sides of the insert, the first and second attachment portions configured to attach the insert to the pedal body. First and second fasteners can be configured to attach the first and second attachment portions to the pedal body. One or more of the fasteners can be a traction pin.

In some embodiments, a pedal can comprise a pedal body, a needle bearing, an outer bearing race and a spindle configured to serve as an inner bearing race. The pedal body can be configured to receive a user's foot, the outer bearing race configured to be fixed with respect to the pedal body and positioned between the needle bearing and the foot without the pedal body being between the needle bearing and the foot at a region at a top of the spindle.

The outer bearing race can have a thickness greater than or equal to a thickness of the pedal body. The outer bearing race may have arms extending therefrom configured to attach to the pedal body at a location spaced away from the needle bearing. The arms can attach to the pedal body with traction pins.

According to some embodiments, a pedal has a spindle, a pedal body configured to rotate about the spindle, and a bearing system to reduce friction between the pedal body and the spindle. The bearing system can have a needle bearing, and a bearing body configured as an outer bearing race separate from and secured to the pedal body. The spindle can act as an inner bearing race for the bearing system, and outer bearing race can comprise a thickness greater than or equal to a thickness of the pedal body.

BRIEF DESCRIPTION OF THE DRAWINGS

Various embodiments are depicted in the accompanying drawings for illustrative purposes, and should in no way be interpreted as limiting the scope of the inventions. In the drawings, like reference characters denote corresponding features consistently throughout similar embodiments.

DETAILED DESCRIPTION OF THE PREFERRED EMBODIMENT

Figure 1:
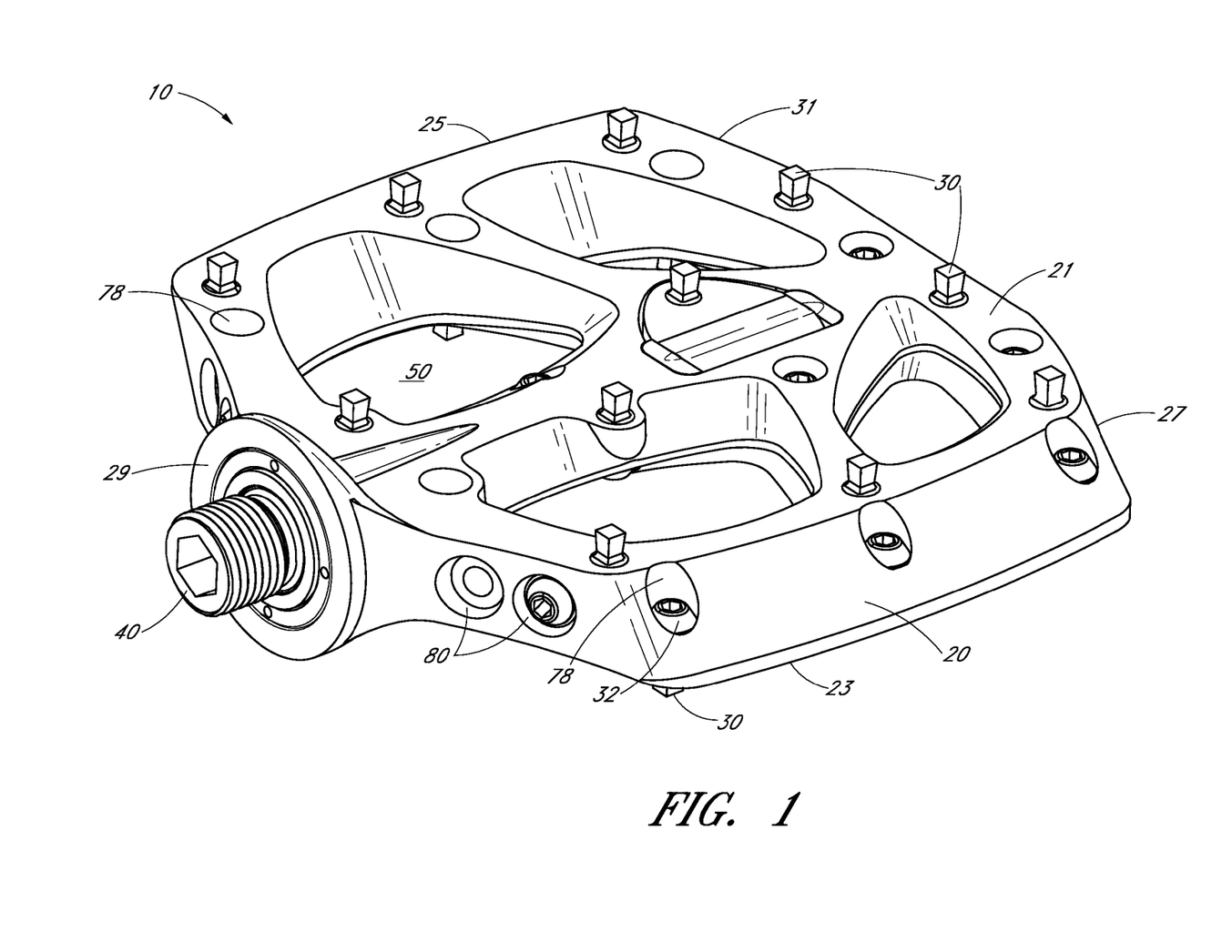
FIG. 1 is a perspective view of a pedal.
Figure 1A:
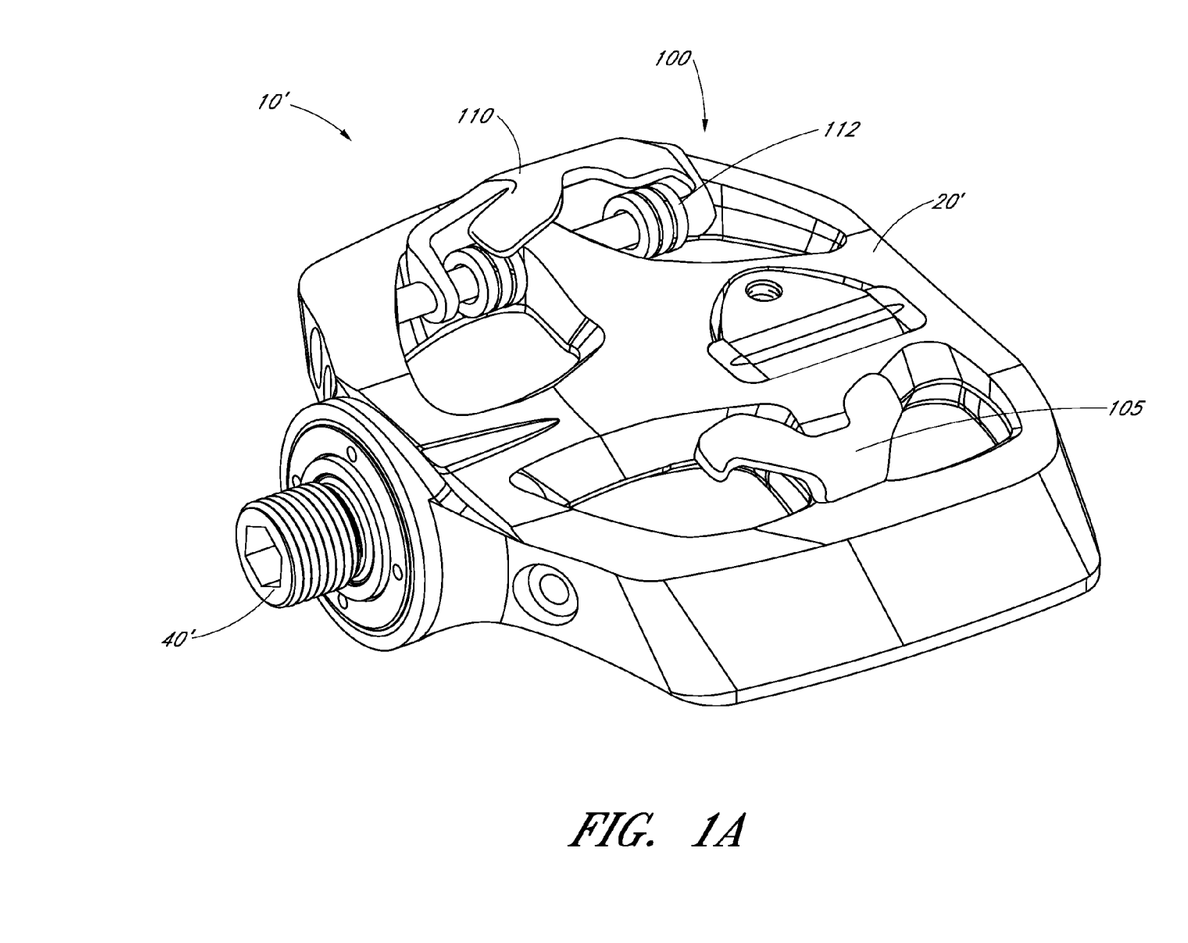
FIG. 1A is a perspective view of another embodiment of a pedal.
Figure 2:
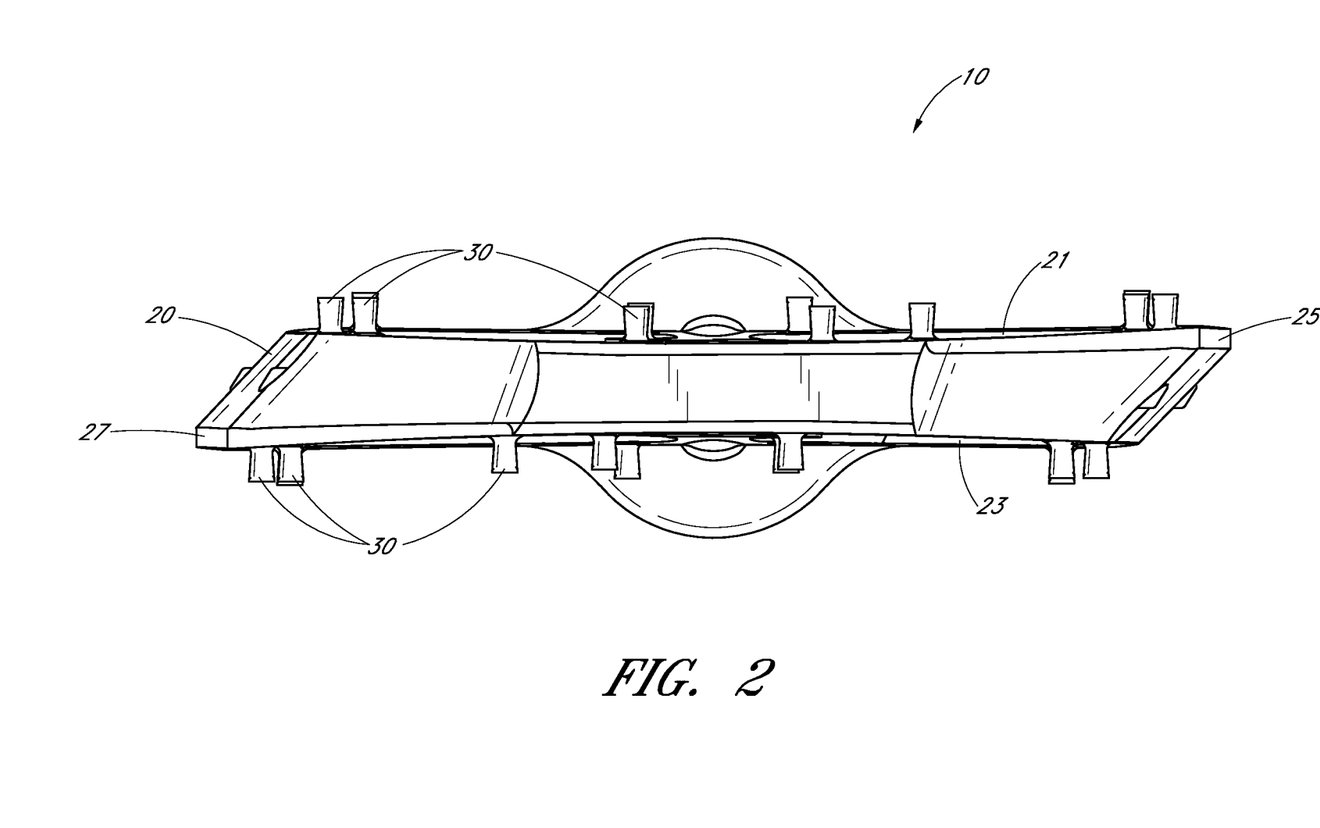
FIG. 2 is an end view of the pedal of FIG. 1.
Figure 3:
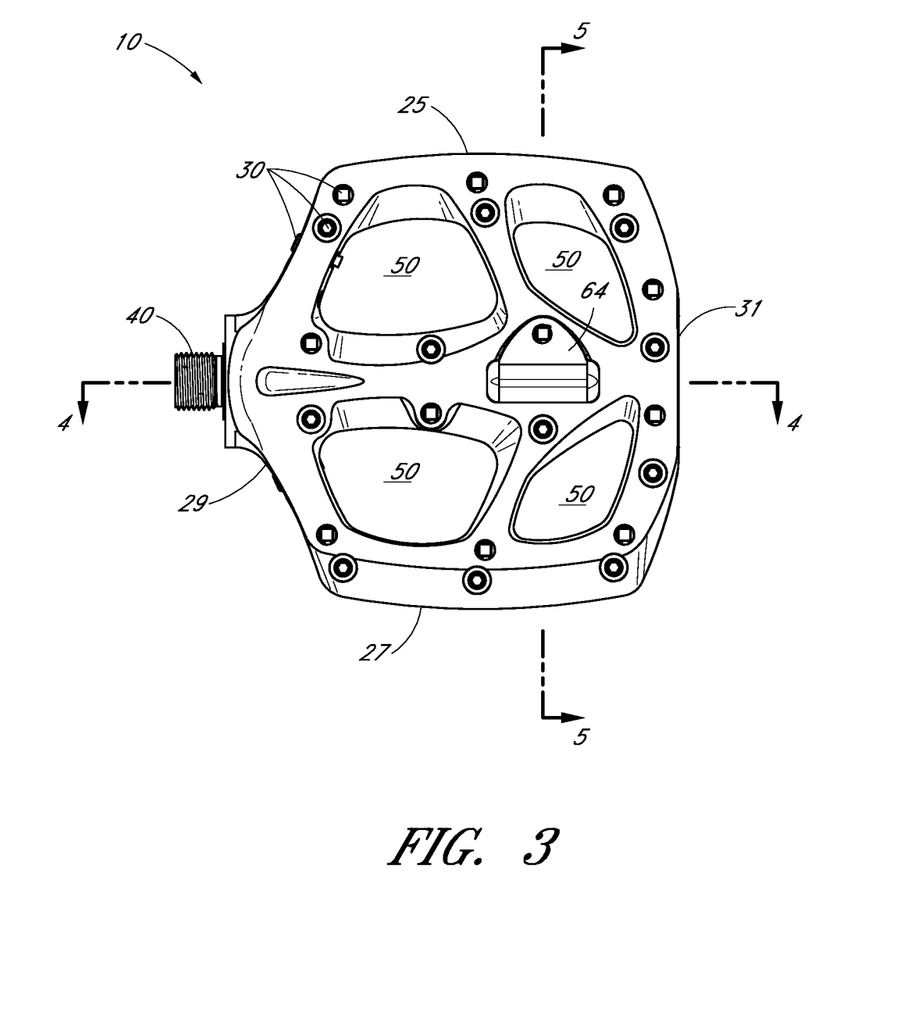
FIG. 3 is a top view of the pedal of FIG. 1.

A pedal 10 is illustrated in FIGS. 1-3, which can include a pedal body 20, traction pins 30, and a spindle 40. The pedal 10 can be a platform pedal and can be dual sided. This means the rider is able to place a foot on whichever of the two surfaces 21, 23 of the pedal that is facing upwards. The pedal 10 can also be part of a set of pedals with a specific right side pedal and a specific left side pedal.

For reference purposes, the pedal 10 will be referred to as a right side specific pedal with reference to a pair of surfaces (a top surface 21 and a bottom surface 23), a front side 25, a back side 27, a left side 29, and a right side 31. A rider can place a foot on the top surface 21, but it will be understood that the pedal body 20 can rotate so that the bottom surface 23 can become the top surface. The rider's toe can be placed near the front side 25 and heel can be near the back side 27. The left side 29 can be closest to the bicycle and the right side 31 can be farther away from the bicycle.

Though the pedal 10 is shown as a dual sided platform pedal (FIG. 2), the pedal can be any type of pedal and can have any of multiple configurations. For example, the pedal can be a clipless pedal 10' (FIG. 1A) or a hybrid with a platform on one side and clipless on the other. In addition, the pedal 10 can have any of multiple configurations such as being dual or multi-sided or single sided. The pedal can also be unspecific to a particular side of the bicycle. In some embodiments, the right and left side pedals can be identical.

The clipless pedal 10' can have a cleat attachment mechanism 100 with front 105 and rear 110 brackets. As can be seen, the front bracket 105 is fixed and the rear bracket 110 includes a spring 112. This allows a user to clip in by pressing down on the pedal 10' with a shoe having a cleat attached thereto. The user can clip out by rotating the shoe. Other styles of cleat attachment mechanisms can also be used.

Referring now to FIG. 2, the pedal body 20 can be made as a single component or can have separate components such as separate plates as part of its structure. The structure can be made of a single material or multiple materials. As an example, the pedal body 20 can be die cast from aluminum, cold forged from aluminum, or extruded from aluminum and then CNC machined. The pedal body 20 may also be anodized and/or painted. Other materials for the pedal body 20 may include one or more of steel, titanium, magnesium, composite, carbon fiber, and plastic.

The pedal body 20 can include one or more cut outs or holes 50 (FIG. 3). The holes 50 can be used to reduce the overall weight of the pedal body 20. The pedal body 20 can form a support surface or frame that can provide a large contact area for a foot of the rider while balancing the needs of strength and stiffness with weight.

The pedal body 20 can be configured to rotate about the spindle 40. The spindle 40 can be configured to attach to a crank arm on a crank assembly of a bicycle. The spindle 40 can allow the rider with feet on the pedals 10 to transfer power to the pedals 10 in an up and down motion as the crank arms and spindles 40 travel around in a generally circular motion.

Figure 4:
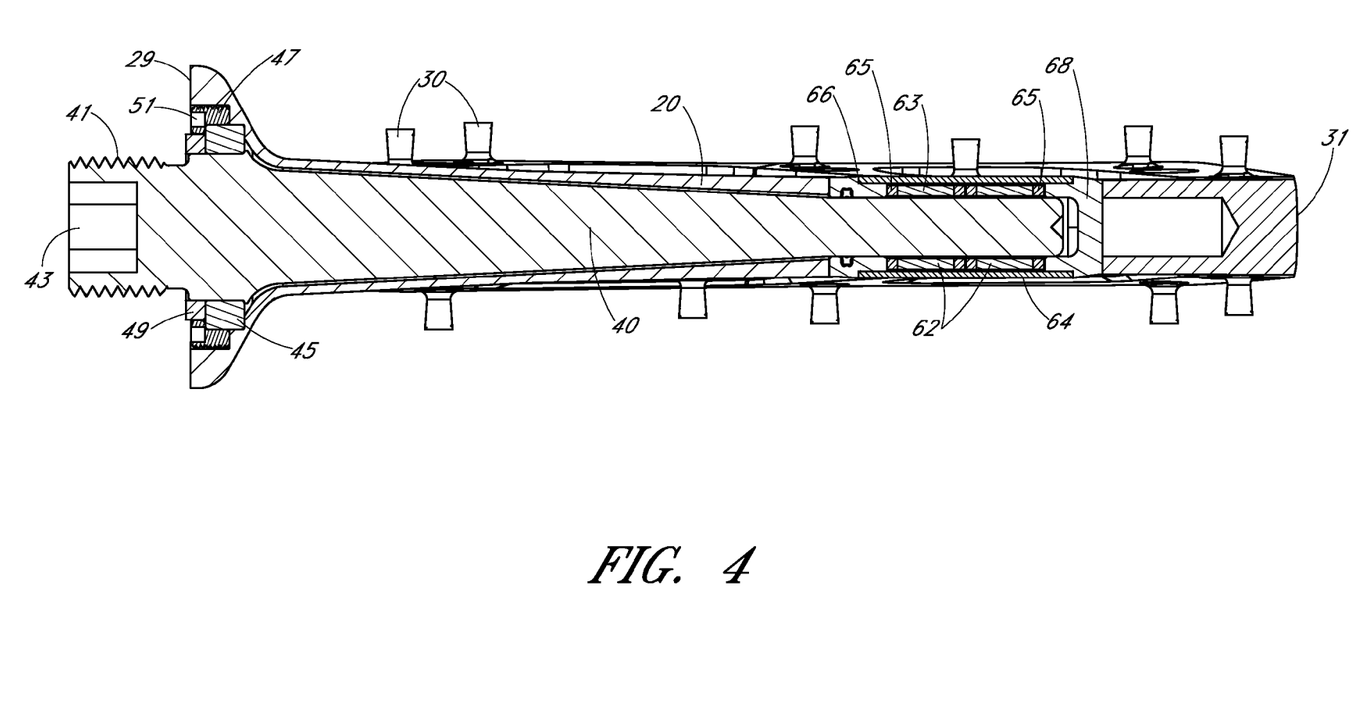
FIG. 4 is a cross-section of the pedal taken along line 4-4 of FIG. 3.
Figure 5:
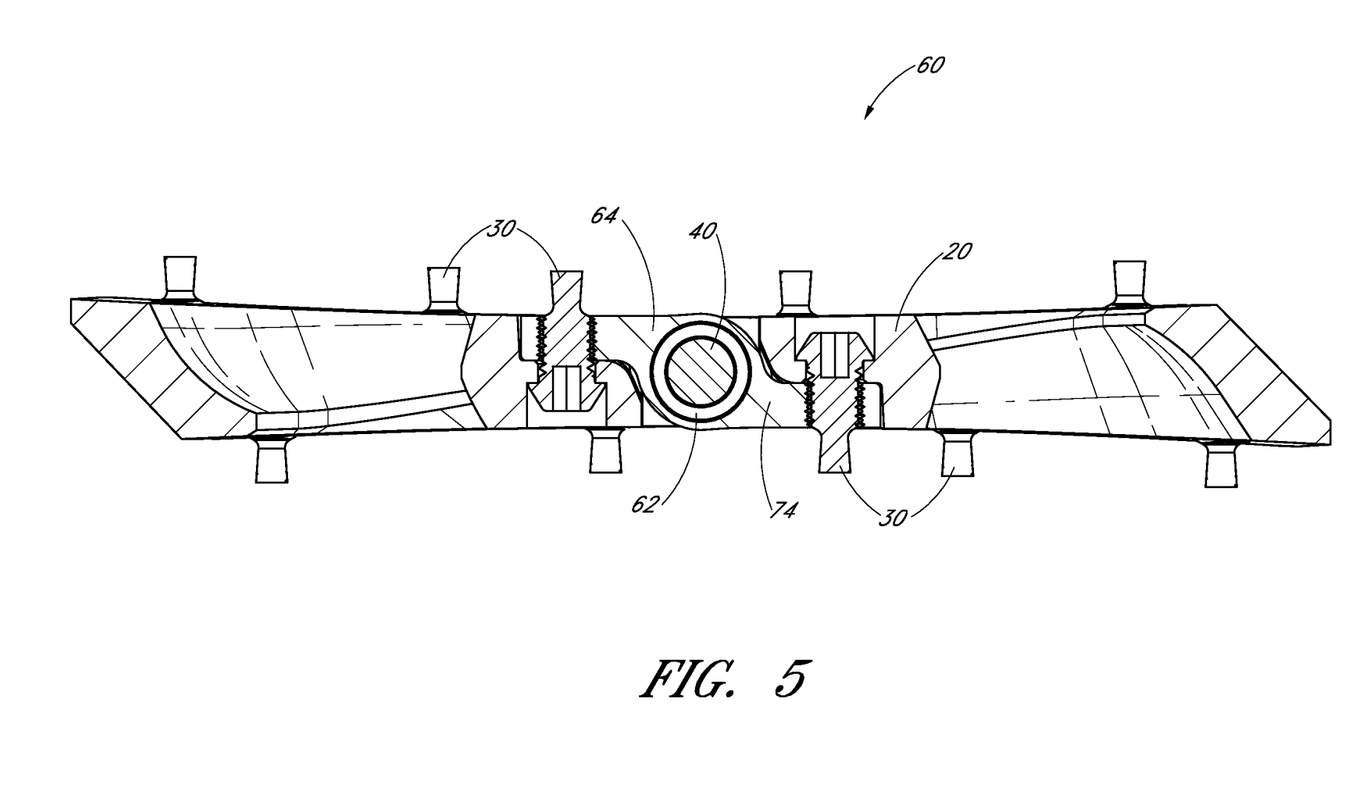
FIG. 5 is a cross-section of the pedal taken along line 5-5 of FIG. 3.
Figure 6:
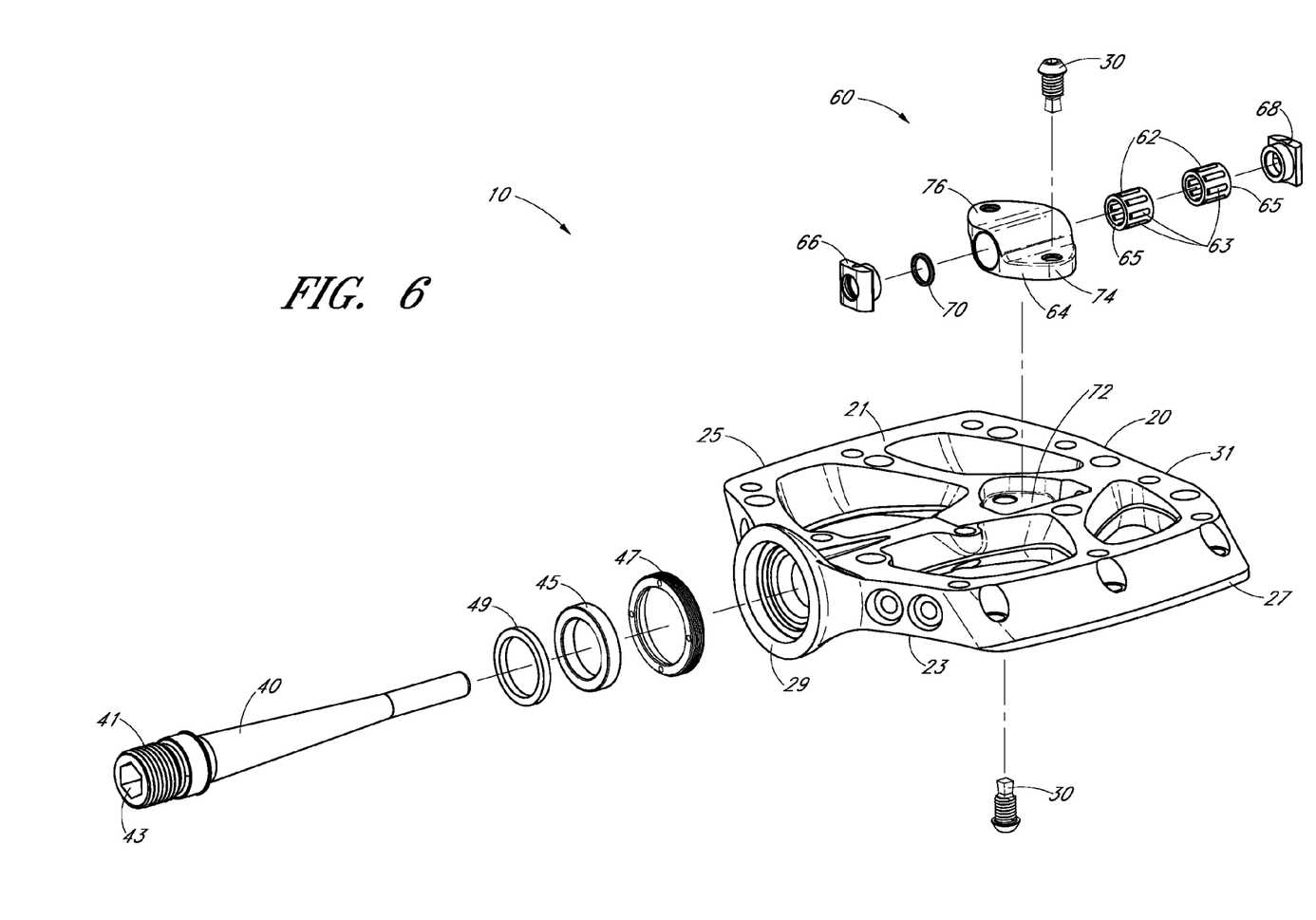
FIG. 6 is an exploded view of a pedal.
Figure 7:
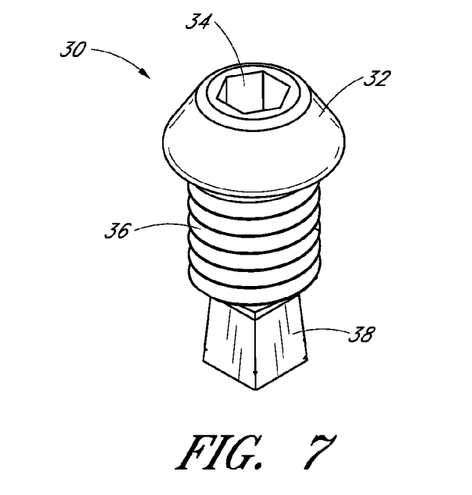
FIGS. 7 and 8 are perspective views of a traction pin.
Figure 8:
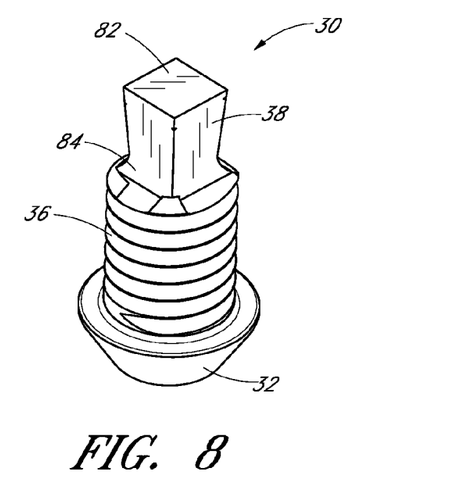

Turning to FIGS. 4-6, the spindle 40 can be seen within the pedal body 20 and extending generally from the left side 29 or the side configured to be the closest to the bicycle. The inner end of the spindle 40 can include threads 41 or other features to secure the spindle and pedal to a crank arm. The threads can be configured to attach to a threaded hole in the crank arm, for example a ⁹⁄₁₆ inch, ½ inch, or 14 mm diameter hole. The spindle 40 can also include a socket 43 to allow a tool to tightly secure the pedal to the crank arm. The socket can be any desirable shape or size, such as a hex, star, or Philips design. For example, the socket can be a 6 mm or 8 mm hex socket. In some embodiments, the spindle 40 can include a section of the outer surface that is a non-round outer surface. For example, the non-round outer surface can have multiple flat sides, such as in the shape of an outside surface of a nut. A wrench or other tool can engage the non-round outer surface and rotate the spindle 40 to secure the pedal 10 to the crank arm. For example, the non-round outer surface can be a 15 mm, ⁹⁄₁₆ inch, or ½ inch hex.

As can be seen, the spindle 40 can have a tapered outer diameter with a larger outer diameter near the inner end at the side 29 and a smaller outer diameter near the distal end proximate the side 31. The tapered configuration can allow the spindle to maintain strength while reducing overall weight. The smaller outer diameter of the spindle can be, for example, 6 mm or between about 5-7 mm. The spindle can be made from one of many materials including steel, and titanium.

The pedal 10 can have a system of bearings that allows the pedal body 20 to rotate about the spindle 40 with minimal friction. For example, there may be one, two, three, or more bearing systems located along the spindle. The bearing systems can be used to reduce friction of the rotating surfaces. The pedal can have an inboard bearing system and an outboard bearing system. As shown in FIGS. 4 and 6, the pedal has a inner bearing system 45 near the inner end at the side 29 and a distal bearing system 60 near the distal end proximate the side 31.

A bearing system can include an inner bearing race, an outer bearing race, and a plurality of bearings, such as ball bearings or needle bearings. In some embodiments, the bearing system can comprise a bushing.

The pedal 10 can have an inner bearing system 45 as shown in FIGS. 4 and 6. The inner bearing system 45 can include an inner bearing race, an outer bearing race, and a plurality of bearings, such as ball bearings. In some embodiments, the inner bearing system 45 can be a commonly available ball bearing assembly.

In some embodiments, the spindle 40 can act as an inner bearing race for the inner bearing system 45. Where the spindle acts as the inner bearing race, the size of the pedal body can be decreased because of a decrease in the number of parts, enabling a decrease in the overall size of the bearing system.

The pedal 10 can also include a bearing retainer ring 47 and a spacer 49 to secure and properly locate the inner bearing system 45 in the pedal 10 with respect to the spindle 40. The bearing retainer ring 47 can also include one or more holes 51 that can be engaged by a tool to secure the bearing retainer ring 47 in place. In some embodiments, during manufacture, the inner bearing system 45 is press fit into the pedal body 20 prior to insertion of the spindle 40 in to the pedal body. The spacer 49 and then retainer ring 47 can then be inserted and/or attached to the pedal body 20.

Referring now to FIGS. 4-6, the pedal 10 is shown with a distal bearing system 60. The distal bearing system 60 can include one or more needle bearings 62. In particular, the distal bearing system 60 is shown with two needle bearings 62. Each needle bearing 62 can have a frame 65 and a plurality of rollers 63. The rollers 63 can comprise cylindrical rollers. The frame or needle cage 65 can be used to orient and contain the rollers 63. The rollers 63 and the frame 65 can be configured to rotate. The needle bearing 62 can have cylindrical rollers 63 that are configured to be parallel to the axis of the spindle 40. The distal bearing system 60 can also include an inner bearing race, and an outer bearing race.

In some embodiments, the spindle 40 can act as the inner bearing race in the distal bearing system 60. An insert or bearing body 64 can serve as the outer bearing race. Referring to FIGS. 4 and 5, it can be seen how the needle bearing 62 can be positioned between the spindle 40 and the insert 64. The needle bearing 62 can be configured to rotate around the spindle 40. The insert 64 can be configured to rotate about the needle bearing 62 and the spindle 40. The pedal body 20 can be connected to the insert 64 such that the pedal body 20 can rotate about the spindle 40, such as when a rider is pedaling a bicycle. As shown in FIG. 1, the insert 64 can form a portion of the top and bottom surfaces 21, 23.

Needle bearings can prove beneficial for many reasons. Needle bearings are readily available without inner and outer bearing races, whereas other types of bearing systems generally are commercially available as pre-assembled systems including the inner and outer bearing races. Needle bearings can also provide the benefit of being low profile as compared to similarly rated bearings, such as ball bearings. Needle bearings also have a large surface area that is in contact with the bearing outer surfaces compared to ball bearings. Needle bearings also provide benefits over bushings. For example, needle bearings have a higher load capacity compared to a similar sized bushing which provides for greater durability and a longer useful life. It is also believed that needle bearings can provide a thinner overall system, usable under normal conditions, as compared to a system using bushings.

Bearing seals 66, 68 and a quad ring or o-ring 70 can also be used to seal, secure, and locate the distal bearing system 60 on the spindle 40 and within the pedal body 20. The needle bearings 62 can be placed inside the insert 64 and the bearing seals 66, 68 can be located on either end of the insert 64.

The insert 64 can be connected to the pedal body 20. In some embodiments, the pedal body 20 can function as the outer bearing race, thereby making the insert 64 unnecessary. Preferably, the pedal 10 includes an insert 64 that serves as the outer bearing race. This is because the pedal body 20 generally does not require the strength or finish required by the bearing races. Thus, for example, the pedal body may be made from aluminum while the spindle and insert may be made from steel or titanium. Many factors may be in favor of keeping these components separate such as the cost of a precision finish and higher quality material for the entire pedal body, the possibility of increased weight, etc.

As best seen in FIG. 6, the pedal body 20 can include a space 72 in which the insert 64 can be placed. The space 72 can be a depression, a hole, a contoured opening, etc. For example, the space 72 can be an opening contoured to the shape of the insert 64 and bearing seals 66, 68.

The insert 64 can be attached to the pedal body 20 in one of many different ways. For example, the insert 64 can be connected to the pedal body by friction fit, press fit, fasteners, and/or sliding engagement, among other methods. As shown, traction pins 30 can be advanced through the top and/or bottom surfaces 21, 23 to engage the insert 64 and secure it in place.

The insert 64 can include one or more attachment portions 74, 76. The attachment portions 74, 76 can be configured to attach the insert 64 to the pedal body 20. As shown, the attachment portions 74, 76 can receive a traction pin 30, or other type of screw to secure the insert 64 to the pedal body 20 within the space 72. In some embodiments, the attachment portions 74, 76 can comprise arms or wings that extend out from a central area or main body in which the needle bearings 62 are installed. The attachments portions can be offset such that one 74 extends from a bottom of the insert 64 and one 76 extends from the top. By extending to the sides of the insert, the attachment portions 74, 76 allow the insert 64 to be attached to the pedal body at one or more locations spaced away from the central axis of the pedal 10.

As the spindle 40 is located at the central axis, and many other components surround the spindle 40, this area can define a minimum thickness of the pedal. In many commercially available designs the outer bearing race is attached to the pedal body in this area as well. The design of the insert, including the spaced away attachment portions 74, 76 can provide for a thinner pedal. The insert 64 can serve as the outer bearing race and can attach to the pedal body at a location spaced away from or to the sides of the spindle. In this configuration, the pedal body 20 at the insert 64 does not add to the total thickness of the pedal 10, as will be described in more detail below.

The smaller outer diameter of the spindle 40 can be, for example, 6 mm or between about 5-7 mm. The insert 64 can have a top to bottom height of 10.2 mm or between about 9-11 mm. A ratio of the spindle diameter to the insert height can be about 0.5, 0.59, 0.6, or between about 0.45 to 0.063 or between about 0.4 to 0.7. The ratio of the spindle diameter to the height of the pedal at the insert can be the same as the ratio of the spindle diameter to the insert height.

The pedal 10 can be assembled as follows. The distal bearing assembly 60 can be assembled and inserted into the space 72 in the pedal body 20. The spindle 40 can then be advanced into the pedal body 20, including being advanced through the distal bearing assembly 60. The bearing assembly 45, followed by the spacer 49 can then be placed on the spindle 40. The bearing retainer ring 47 can then be secured to the pedal body 20 to secure and properly locate the inner bearing system 45 and spindle 40 in the pedal 10. The traction pins 30 can then be attached to the pedal body, in particular to secure the insert 64 to the pedal body 20.

In some embodiments, the pedal 10 can be easily assembled and disassembled by the end user or rider. This can allow the pedal to be maintained, such as allowing the application of grease or lubrication within the pedal 10.

In some embodiments, the insert can comprise a central region of the pedal. For example, the insert could surround the spindle from end to end. The insert can serve as an outer bearing race as described here. The pedal body can then be attached to the insert, for example, having a multi-piece construction with a front section and a rear section. In this configuration the pedal body can be in front of and behind the insert. In some embodiments, the pedal body can not be on the top or bottom of the insert, at least for a portion of the insert at the top and bottom of the spindle.

The inner bearing system 45 can be an inboard bearing system and the distal bearing system 60 can be an outboard bearing system. The inboard inner bearing system 45 can act as a thrust bearing component that keeps the pedal body attached to the spindle when using needle bearings in the outboard location.

A thrust component is used to retain the body on the spindle. The thrust component can be located at either or both of the inboard or the outboard location. The inboard location in some embodiments is convenient because of the larger diameter around spindle. The thrust component can be achieved in many ways including ball bearings, angular contact bearings, thrust bearings or bushings.

In some embodiments, rather than or in addition to a thrust component, the pedal 10 can include a bolt, nut, cap, clip, or other similar type device to secure the pedal body 20 on the spindle 40 and to prevent axial movement. In some embodiments, the distal end of the spindle 40 proximate the side 31 of the pedal can be threaded to receive a nut. The distal end of the spindle 40 can pass through the pedal body 20 such that securing the nut in place also secures the pedal body 20 onto the spindle 40.

One desirable trait in a pedal is for the rider's foot to sit as close to the spindle as possible. To achieve this result many pedals have a thin pedal body, but the size of the pedal body is often limited by other factors such as the spindle itself and the bearings. In many pedal designs, the pedal thickness in the center is determined by the sum of the spindle, the bearing system (inner race, ball bearings, outer race) and the pedal body which surrounds the bearing system and the spindle.

The pedal 10 has a number of advantages over the prior art. For example, the pedal 10 provides a pedal body 20 that is does not add to the total thickness of the pedal 10 at and around the insert 64. This is because of the use of needle bearings 62 where the spindle 40 and insert 64 act as the inner and outer bearing races, among other features. The pedal body 20 surrounds the bearing insert 64 on many sides, but does not add to the total thickness. As discussed above, the insert 64 attaches to the pedal body at locations spaced away from and to the sides of the spindle 40. This configuration eliminates layers of material that would otherwise contribute to the total thickness of the pedal 10. Prior art designs require separate inner and outer bearing races and include portions of a pedal body on above and below the bearing races. In addition, having the insert attach to the pedal body at a location spaced from the spindle allows for a lower profile design which can be seen in particular with reference to FIGS. 2, 4, and 5. Thus, according to some embodiments, the thickness of the pedal body 20 can be less than or equal to the thickness of the insert 64 or outer bearing race. This thickness of the pedal body 20 can be along a portion of the body, along the entire body, along a central region, or along a shoe engagement region of the pedal body. Looking in particular to FIG. 5, it can also be seen that the pedal body 20 is built around, or surrounds the insert/outer bearing race 60.

Returning now to FIG. 1, it can be seen that the pedal 10 can include features 30 to increase friction or traction between the rider's foot or shoe and the pedal itself. These features can include tread on the pedal. In some embodiments the tread can be detachable. A plurality of traction pins 30 are shown that can be attached to the pedal body 20. The traction pins 30 can be added or removed per rider preference, and can be longer or shorter per rider preference.

As shown, the traction pins 30 can be screwed in from either the top 21 or bottom 23 surface of the pedal body 20 so that they will project out from the other surface. In some embodiments, the traction pins 30 can be screwed in from either the top surface 21 or the bottom surface 23 and will project out from that same surface. In some embodiments, the pins 30 can be attached by other methods. The pedal body 20 can include a recess 78 for receiving a head 32 of the traction pin 30. Desirably, in some embodiments, the head 32 defines an interference surface which cooperates with a mating interference surface on the pedal body 20 to limit movement of the pin 30 relative the pedal body to easily position the traction pins 30 in the pedal body 20 and, therefore, position the protrusion relative the top 21 of the pedal body 20. The head 32 can have a hex or screwdriver slot 34 in the head.

In some commercially available pedals, the pins cannot be replaced after they have become worn down or broken. The heads are exposed to impacts and wear that can damage the head. As the head wears, the hex or screwdriver slot becomes more and more difficult to access, making the pins difficult or impossible to remove with the correct tool. Typically, a broken traction pin breaks off at the base of the platform, leaving nothing to grab for removal.

The pedal 10, the recess 78 and the installation from underneath can allow the traction 30 to be replaced even after excessive wear on the pin itself. The advantage is that the head of the traction pins do not wear, and if the pin breaks off from an impact, the head is still intact for removing the broken pin.

Still referring to FIG. 1, the pedal 10 can also include spare pin storage. There can be one or more locations on the pedal which allow for on-board storage of replacement traction pins 30, in the event of damage that might require replacement in the field. For example, the pedal body 20 can have a location 80 for storing extra traction pins. The storage location 80 can be located on the pedal body 20 in a position so as to not contact the rider's shoe and so as to be protected from debris and other objects and surfaces that might wear down and damage the pin 30. In some embodiments, the storage location 30 can be on either side of the spindle on the side 29 nearest the bicycle. For example, the pedal body can have four storage locations 80, two on either side of the spindle 40.

Looking now to FIGS. 7-10, detailed views of a traction pin 30 are shown. The traction pin 30 can be used to provide a friction connection to the sole of the rider's shoe. The traction pin 30 has a head 32 with a slot 34 for receiving an assembly tool. The slot 34 can be a hex, star, flat, Philips, or other configuration. Following the head 32 is a threaded region 36 and then a protrusion or extension 38.

As shown, the protrusion 38 has a square top 82 and four sides. The protrusion 38 can also have a round top and be cylindrical in nature. A square shape can increase the circumference of the top edge of the pin as compared to a circle or round top. The square shape can therefore engage more of the sole of the rider's shoe as compared to a round shape. A square also creates "points" which produce a sharper, almost knifelike engagement to the sole. The protrusion 38 can also be other non-round shapes to provide similar benefits, for example, triangle, hexagon, star, x-shaped, etc. A square shape is generally an easier shape to manufacture as compared to other non-round shapes.

Figure 9:
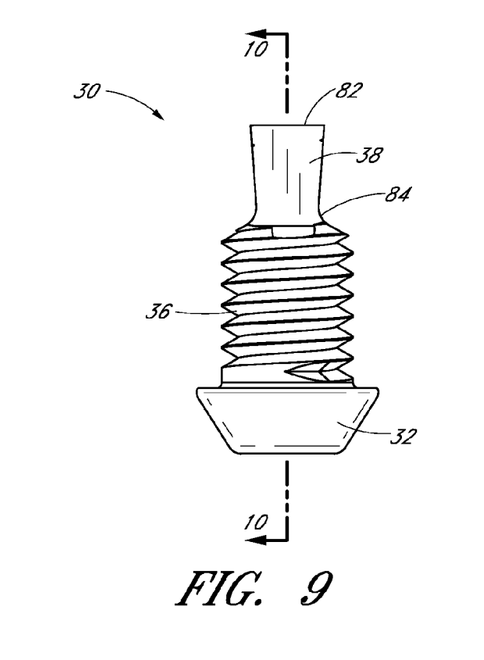
FIG. 9 is a side view of the traction pin of FIGS. 7 and 8.
Figure 10:
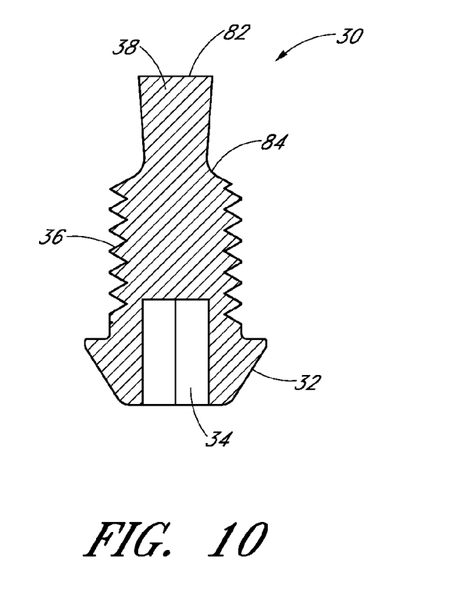
FIG. 10 is a cross-section of the traction pin taken along line 10-10 of FIG. 9.

The protrusion 38 is also illustrated with an undercut configuration as best seen in FIGS. 9 and 10. This means that the top 82 is larger than the bottom 84. The undercut design creates a sharper edge at the top 82 to engage the sole of the shoe. This can also help keep the shoe sole from slipping over the top of the pin. An undercut design can be used with a most top shapes including round, triangle, hexagon, star, x-shaped, etc. The undercut design can also be integrated into tread features on the pedal body, such as tread that is not detachable.

The traction pins 30 as shown and described can beneficially provide a greater level of engagement the soles of the rider's shoes, in particular where those shoes have soft rubber soles.

Figure 11:
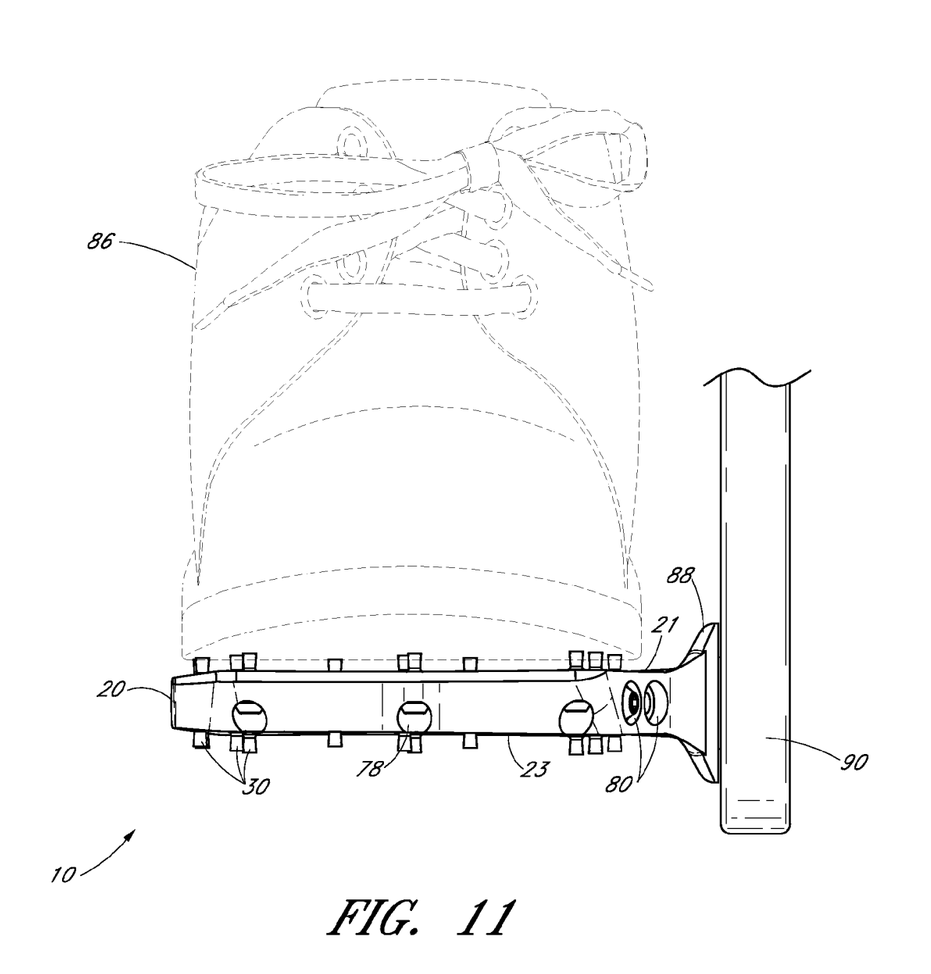
FIG. 11 illustrates a pedal connected to a crank arm with a shoe sitting on the pedal.

FIG. 11 shows a shoe 86 in broken lines sitting on a pedal 10. It also shows schematically how the traction pins 30 can engage the sole of the shoe 86.

The pedal 10 is also shown engaged with a crank arm 90. As has been mentioned, the spindle 40 can be screwed into the crank arm 90. As the crank arm 90 and spindle travel in a circular motion, the shoe 86 and pedal 10 can move up and down.

The pedal 10 may also include a crank arm shield 88. The crank arm shield 88 can be a protrusion or lip that is contoured to fit against the crank arm 90. The crank arm shield 88 can act as a guard barrier or shield to keep the rider's shoe positioned on the pedal and away from the crank arm 90. It is common that a rider's foot migrates toward the crank arm, resulting in friction, crank wear and potentially dislodging the rider's foot from the pedal. The crank arm shield 88 can beneficially prevent such migration and the resulting consequences.

The crank arm shield 88 can also house the inboard inner bearing system 45 and can completely enclose the spindle when connected to the crank arm 90. The enclosed spindle can eliminate the possibility of the rider's shoe from contacting the spindle, thus eliminating possible friction and wear.

Although this invention has been disclosed in the context of certain embodiments and examples, it will be understood by those skilled in the art that the invention extends beyond the disclosed embodiments to other alternative embodiments and/or uses of the invention and obvious modifications and equivalents thereof. Additionally, it is contemplated that various aspects and features of the invention described can be practiced separately, combined together, or substituted for one another, and that a variety of combination and sub-combinations of the features and aspects can be made and still fall within the scope of the invention. Thus, it is intended that the scope of the invention should not be limited by the above description, but should be determined only by the claims.

What is claimed is:
1. A bicycle assembly comprising:
   a pedal having a pair of surfaces interchangeably configured to receive a foot and comprising:
     a pedal body;
     a spindle having a first end and a second end, the first end configured to be received by a crank arm attached to a bicycle frame, the second end received into the pedal body;

a needle bearing received on the spindle, wherein the spindle is configured to act as an inner bearing race of the needle bearing;

an insert configured to be received on the needle bearing and configured to attach to the pedal body, wherein the insert is configured to serve as an outer bearing race for the needle bearing, the insert at the needle bearing forming a portion of each of the pair of surfaces of the pedal, the insert comprising first and second attachment portions on opposite sides of the insert, the first and second attachment portions configured to attach the insert to the pedal body; and first and second fasteners, wherein the fasteners are configured to attach the first and second attachment portions to the pedal body, each fastener further comprising a traction pin;

wherein the pedal body surrounds at least a part of the insert but does not cover the insert where the insert forms the portion of each of the pair of surfaces of the pedal.

2. The bicycle assembly of claim 1, wherein the needle bearing comprises a plurality of rollers and a cage to position and contain the rollers.

3. The bicycle assembly of claim 1, wherein the needle bearing comprises two needle bearings.

4. The bicycle assembly of claim 1, wherein the pedal comprises at least one of a clipless and a platform pedal.

5. The bicycle assembly of claim 1, wherein the insert has four sides and the pedal body surrounds the insert on all four sides.

6. A bicycle assembly comprising:
a pedal having a pair of surfaces interchangeably configured to receive a foot and comprising:

a pedal body;

a spindle having a first end and a second end, the first end configured to be received by a crank arm attached to a bicycle frame, the second end received into the pedal body;

a needle bearing received on the spindle, wherein the spindle is configured to act as an inner bearing race of the needle bearing;

an insert configured to be received on the needle bearing and configured to attach to the pedal body, wherein the insert is configured to serve as an outer bearing race for the needle bearing, the insert at the needle bearing forming a portion of each of the pair of surfaces of the pedal; and a traction pin, wherein the insert is secured to the pedal body with the traction pin;

wherein the pedal body surrounds at least a part of the insert but does not cover the insert where the insert forms the portion of each of the pair of surfaces of the pedal.

7. The bicycle assembly of claim 6, wherein the needle bearing comprises a plurality of rollers and a cage to position and contain the rollers.

8. The bicycle assembly of claim 6, wherein the needle bearing comprises two needle bearings.

9. The bicycle assembly of claim 6, wherein the pedal comprises at least one of a clipless and a platform pedal.

10. The bicycle assembly of claim 6, wherein the insert has four sides and the pedal body surrounds the insert on all four sides.

* * * * *